March 10, 1931.　　　E. G. BUDD　　　1,795,472
DISK WHEEL
Filed May 3, 1929

INVENTOR.
EDWARD G. BUDD.
BY
ATTORNEY.

Patented Mar. 10, 1931

1,795,472

UNITED STATES PATENT OFFICE

EDWARD G. BUDD, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA

DISK WHEEL

Application filed May 3, 1929. Serial No. 360,225.

This invention relates to integral wheel bodies, disks and rims, and especially to rims peripherally divisible for the purpose of demounting of the tire. But quite obviously it has other applications, for example, rims having simple removable flanges locked on in many of the well known ways.

Its object is the evolution of a better wheel of such type, better by reason of simple and more sturdy construction, better because the desirable sections are the more rigidly and strongly anchored together, better because the disk and rim connections are improved, and better because more economical in production.

The aims of my invention I attain by integrally rolling the disk and one of the peripheral rim divisions, but more importantly by rolling integrally with the tapered main body of the disk and integral radially extending peripheral portion of thickened cross section, providing a bead at the base of this radially extending thickened section, integrally forming one portion of the rim from this radial thickened section, and removably mounting the complemental rim portion upon the thickened section and seating it on the bead. Such a structure is especially well adapted for production upon an obtuse angled rolling mill in which the parts are integrally connected together, and may be formed by one and the same rolling operation.

Of the drawings which show my embodiments,

Fig. 5 is a modification of the removable rim section.

Figure 2:
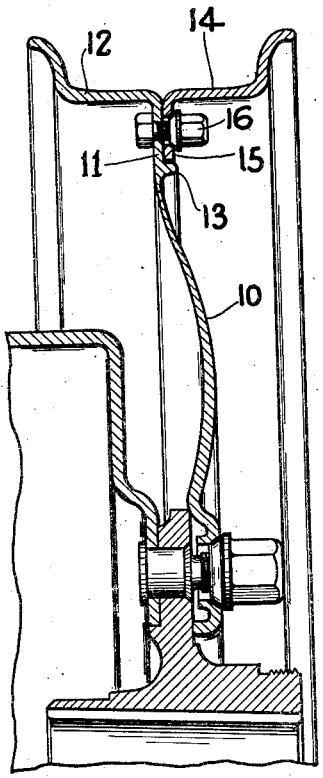
Fig. 2 is a radial cross section substantially on line 2—2 of Fig. 1.
Figure 1:
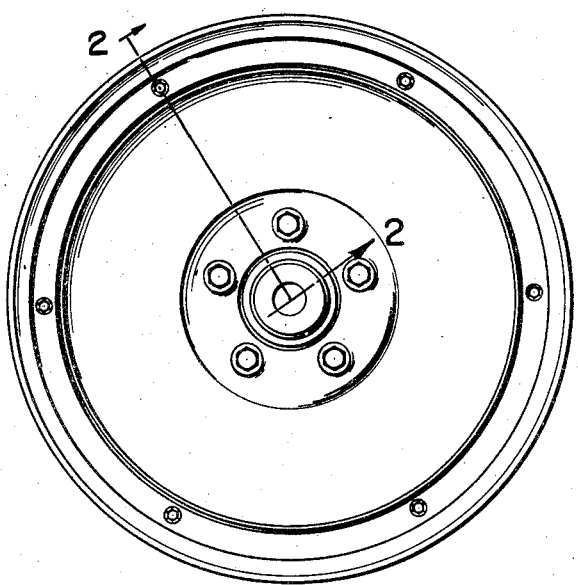
Fig. 1 is a side elevation of a wheel embodying my invention.
Figures 3, 4:
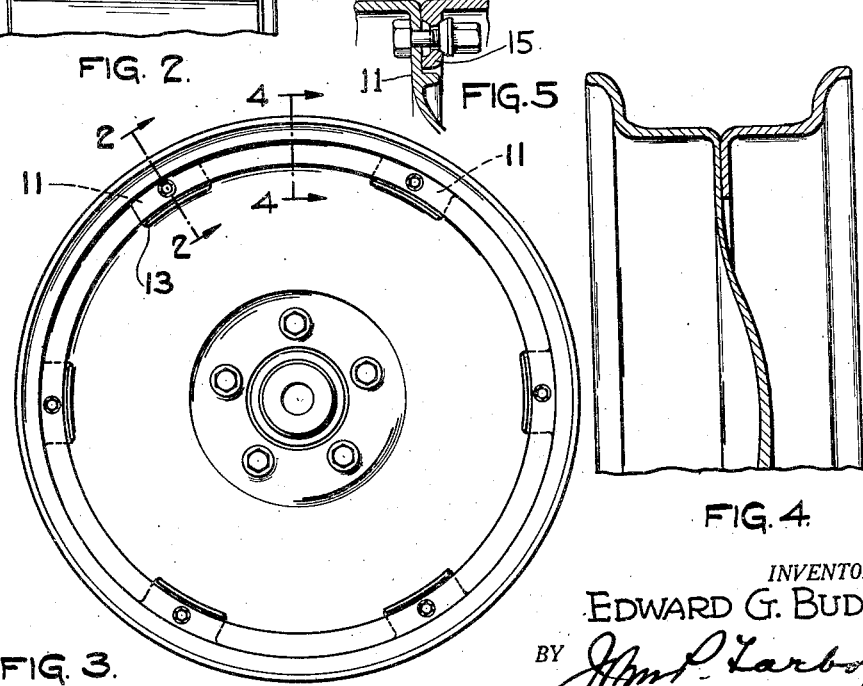
Fig. 3 is a side elevation of a modification.
Fig. 4 is a cross section on line 4—4 of Fig. 3.

The tapered wheel disk or tapered main body is designated 10. Its radially extending peripheral portion of thickened cross section is designated 11, the integrally formed rim portion 12, the integrally formed bead at the base of the thickened portion 13, and the removable complemental rim portion 14. This complemental removable portion 14 is provided with an inwardly turned flange 15 seating upon bead 13 and bolted fast by studs and nuts 16 to the portion of thickened section 11. In the form of Figs. 1 and 2, the portion of thickened section 11 and the bead 13 are angularly continuous. In the form of Figs. 3 and 4, the portion 11 and bead 13 are discontinuous, being extended for a limited distance on opposite sides of the studs and nuts 16, as clearly appears in Fig. 3, and as is to be presumed from Fig. 4. In both cases, the integrally extended rim 12 and the complemental rim portion 14 and its flange 15 are likewise of thickened cross section.

The manner of formation in the rolling mill may vary considerably. The original rolling of parts 10, 11, 12 and 13 may be relied upon to give them substantially their final form. But preferably they are rolled partly toward final form or substantially all the way toward final cross section. Thereafter, they are given the proper contours by die stamping operations. In such case the bead 13 and the portion of thickened cross section 17 are utilized for clamping in the centering and holding down portions of the dies, thereby preventing the strain of the die operation on the rim portion 12 from being communicated to such a degree to the reduced cross section of the main body 10 of the disk as to unduly strain or distort the same. The complemental rim portion 14 may be formed in any of the known ways of forming rim section.

But beyond entering into the advantages as outlined, the thickened cross section 11 and its associated bead 13 strengthen the periphery of the wheel markedly in the region where the demountable complementary rim section 14 must be secured in place. Thereby, the wheel is made stiffer, stronger, sturdier, and the anchorages for the studs and nuts 16 and the general bracing of the connected parts and mutual reinforcement is attained in high degree. The bead 13 of course, keeps the complemental portion 14 in better alignment, and takes the radial strain from the bolts and nuts in case of any loosening of the same. Yet further it provides a very ornamental appearance for the joint between the parts.

Fig. 5 shows the flange 15 of the rim section 14 of outwardly convex form, as in the Michelin disk wheels. This provides a better seating for the flange and more secure fastening of the nuts.

My invention, like all others, is susceptible of modifications which are to be comprehended in the annexed claim.

What I claim and desire to protect by Letters Patent is:

A vehicle wheel comprising a tapered disk having a thickened portion adjacent its outer periphery, said thickened outer periphery being bent to form a portion of a rim section, a bead formed integrally with the thickened portion and forming a seat for a complemental rim portion, said complemental rim portion being seated against said bead and removably secured to said integral disk and rim.

In testimony whereof I hereunto affix my signature.

EDWARD G. BUDD.